(12) United States Patent
Wakabayashi et al.

(10) Patent No.: US 6,309,029 B1
(45) Date of Patent: Oct. 30, 2001

(54) VEHICLE BRAKING DEVICE

(75) Inventors: Takeshi Wakabayashi; Kazuhiko Tani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/442,338

(22) Filed: Nov. 17, 1999

(30) Foreign Application Priority Data

Nov. 17, 1998 (JP) .................................................. 10-327111
Nov. 17, 1998 (JP) .................................................. 10-327112

(51) Int. Cl.$^7$ .............................. B60T 8/00; B60T 1/06; B60T 8/26; B60T 8/42; B60T 13/66

(52) U.S. Cl. ..................... 303/9.64; 188/106 P; 188/349; 188/3.44; 303/9.75; 303/DIG. 3; 303/113.2

(58) Field of Search ................................... 303/9.64, 137, 303/9.62, 9.61, 9.71, 9.72, 9.75, DIG. 3, DIG. 4, 166, 113.5, 186–189, 6.01, 113.4, 115.2, 3, 2, 162, 113.2, 113.1, 15, 14, 18; 188/344, 349, 106 P, 72.5, 156–165, 16, 354, 345; 701/70

(56) References Cited

U.S. PATENT DOCUMENTS

| 4,626,038 | * | 12/1986 | Hayashi et al. ..................... 303/9.64 |
| 4,807,943 | * | 2/1989 | Ogino . | |
| 4,838,622 | * | 6/1989 | Kircher et al. . | |
| 5,029,950 | * | 7/1991 | Vennemeyer et al. . | |
| 5,184,877 | * | 2/1993 | Miyakawa . | |
| 5,219,211 | * | 6/1993 | Tsuchida et al. ..................... 303/6.01 |
| 5,273,346 | * | 12/1993 | Tsuchida et al. ..................... 303/2 |
| 5,372,408 | * | 12/1994 | Tsuchida et al. ..................... 303/9.64 |
| 5,544,946 | * | 8/1996 | Toyoda et al. ..................... 188/106 P |
| 5,609,399 | * | 3/1997 | Feigel et al. . | |
| 5,620,237 | * | 4/1997 | Iwashita et al. ..................... 188/106 P |
| 6,070,949 | * | 6/2000 | Hariu et al. ..................... 188/106 P |

FOREIGN PATENT DOCUMENTS 7196068   8/1995  (JP) .

* cited by examiner

Primary Examiner—Douglas C. Butler
(74) Attorney, Agent, or Firm—Birch, Stewart, Kolasch & Birch, LLP

(57) ABSTRACT

A braking device for a vehicle having an operational hydraulic brake system, and an electronically controlled brake system. The hydraulic brake system and the electronically controlled brake system act independently on a brake caliper of a hydraulic brake. The electronically controlled brake system independently controls the hydraulic actuator for applying a hydraulic pressure to the brake caliper with no interference between the brake systems, which increases the degree of freedom of electronic control of the brakes. A braking device is also applied in a vehicle having an ABS control device.

10 Claims, 10 Drawing Sheets

VEHICLE BRAKING DEVICE

BACKGROUND OF THE INVENTION

1. Field of the Invention

The present invention relates to a braking device in a vehicle.

2. Background Art

A conventional braking operation in a motorcycle is carried out by operating a brake lever provided on a handle grip, and a brake pedal provided on a step. An electronic control is applied to a part of the brake system to control a front brake for braking a front wheel, and a rear brake for braking a rear wheel. Such a brake system employing electronic control is described in Japanese Patent Laid-open No. 7-196068.

In Japanese Patent Laid-open No. 7-196068, an operational pressure generated in a primary master cylinder operated by the brake lever or the brake pedal is detected, and an electronic control unit controls an actuator according to the operational pressure detected. An output from the actuator and the output from the primary master cylinder are separately input into a secondary master cylinder, and a hydraulic pressure generated in the secondary master cylinder is supplied through a control valve to the brake.

The above brake system is limited in that the operational input from an operator and the input from the electronic control unit interfere with one another.

To avoid such interference, it is possible to configure two independent input systems for independently applying the operational input from the operator, and the input from the electronic control unit to the brake. However, if an anti-skid brake system ("ABS") is added to the system, control logic is complicated because the two systems are controlled independently of each other. The number of parts and the cost is thereby increased.

FIG. 10 of the present application shows another conventional brake system. In FIG. 10 of the present application, reference numerals 02 and 05 denote front and rear hydraulic brakes, respectively. Reference numerals 06 and 011 denote a brake lever and a brake pedal, respectively, as brake operating means. The brake lever 06 is provided with a lever master cylinder 07, and the brake pedal 011 is provided with a pedal master cylinder 012.

A lever hydraulic system 08 extending from the lever master cylinder 07 is connected to the front brake 02. A pedal hydraulic system 013 extending from the pedal master cylinder 012 is connected to one of the three ports of the rear brake 05. A hydraulic circuit 014 branched from the pedal hydraulic system 013 is connected to a secondary master cylinder 010. An output from the secondary master cylinder 010 is connected through a control valve 016 to the other two ports of the rear brake 05.

The brake lever 06 is provided with a brake switch 040 adapted to open and close according to whether the brake lever 06 is pivotally moved. The lever hydraulic system 08 is provided with a pressure sensor 041 for detecting a hydraulic pressure generated in the lever master cylinder 07. Detection signals from the brake switch 040 and the pressure sensor 041 are input into a control unit 031. The control unit 031 decides a hydraulic pressure to be generated in the secondary master cylinder 010 according to the detection signals from the brake switch 040 and the pressure sensor 041, and operates an actuator 033 through a relay 032 to thereby generate the decided hydraulic pressure in the secondary master cylinder 010. In the case that the brake pedal 011 only is operated, only the rear brake 05 is operated.

In the case that the brake lever 06 only is operated or both the brake lever 06 and the brake pedal 011 are simultaneously operated, the hydraulic pressure generated in the lever master cylinder 07 operates the front brake 02. At the same time, the actuator 033 is operated by the control unit 031 according to the hydraulic pressure in the lever hydraulic system 08 to generate a required hydraulic pressure in the secondary master cylinder 010. This hydraulic pressure operates the rear brake 05 through the control valve 016.

The output from the electronically controlled actuator 033 interferes with the pedal hydraulic pressure in the secondary master cylinder 010, and is thereafter mechanically set by the control valve 016. As a result, the degree of freedom of electronic control is limited.

In this manner, the electronically controlled brake system connected to the two ports of the brake caliper of the rear brake 05 is not completely independent of the pedal hydraulic system, but is affected by the pedal hydraulic pressure. Accordingly, it is difficult to electronically give priority to the pedal operation by an operator to perform brake control. As a result, braking operability by the operator is limited.

It is accordingly an object of the present invention to provide a braking device in a vehicle which can increase the degree of freedom of electronic control by making an independent electronically controlled brake system act on a part of a hydraulic brake, and which can also ensure braking operability by an operator.

It is also an object of the present invention to provide a braking device in a vehicle having ABS control means which can eliminate interference between inputs, and avoid overly complicated control logic.

SUMMARY OF THE INVENTION

According to a first embodiment of the present invention, a braking device is provided for a vehicle having a hydraulic brake for braking a wheel. The hydraulic brake has a brake caliper with a plurality of ports. The braking device includes an operational hydraulic brake system having hydraulic pressure transmitting means for applying an amount of brake operating means, such as brake fluid, to a number of said ports of said brake caliper.

The brake system also includes an electronically controlled brake system having a hydraulic actuator and an electronic control means for controlling said hydraulic actuator according to the amount of brake operating means in order to apply a hydraulic pressure to the other ports of said brake caliper.

The hydraulic brake system and the electronically controlled brake system act independently on the brake caliper of the hydraulic brake. The electronically controlled brake system independently controls the hydraulic actuator for applying a hydraulic pressure to the brake caliper without interference, thus increasing the degree of freedom of electronic control. Furthermore, a controlled condition is enabled so that selective priority may be given to the braking operation as desired.

The hydraulic brake is operated by both the operational hydraulic brake system and the electronically controlled brake system. Accordingly, if one of the two systems fails, the hydraulic brake can be operated by the other system.

The electronically controlled brake system also has a slip detecting device for detecting an amount of slip of a drive wheel on a road surface. The hydraulic brake acts on the drive wheel to brake the drive wheel, and the electronic control means controls the hydraulic actuator according to the amount of operational brake operating means and the amount of slip detected by the slip detecting device.

The electronic control means can set the slip amount from the operational amount of brake operating means to start traction control. Accordingly, by setting the slip amount to a larger value to retard the start of the traction control by the electronically controlled brake system, according to the manner of the braking, the degree of freedom of the braking operation using the operational hydraulic brake system can be increased.

According to a second embodiment of the present invention, a braking device is disclosed having a hydraulic brake for braking a wheel. The hydraulic brake has a brake caliper having a plurality of ports, and the braking device has an operational hydraulic system having hydraulic pressure transmitting means for applying an operational amount of brake operating means through ABS control means to a number of said ports of said brake caliper.

The brake device also has an electronically controlled hydraulic system having a hydraulic actuator, and driving means for driving said hydraulic actuator. An electronic control means controls the driving means according to the operational amount of brake operating means to apply a hydraulic pressure to the other ports of the brake caliper. The operational hydraulic system and the electronically controlled hydraulic system are arranged in parallel. The driving means drives the ABS control means in relation to the hydraulic actuator.

The operational hydraulic system and the electronically controlled hydraulic system are arranged in parallel so that the inputs from the two systems do not interfere with each other.

While the ABS control means is provided in the hydraulic pressure transmitting means, the ABS control means is driven by the driving means for driving the hydraulic actuator. Accordingly, no complicated control logic is required and the number of parts can be reduced.

The hydraulic brake according to the second embodiment includes a front brake for braking a front wheel and a rear brake for braking a rear wheel. Brake operating means is provided to the front brake and the rear brake. The hydraulic actuator includes a first hydraulic actuator connected to the front brake and a second hydraulic actuator connected to the rear brake. The driving means has a first driving means for driving the first hydraulic actuator and second driving means for driving the second hydraulic actuator. The electronic control means controls the first and second driving means according to operational amounts of the first and second brake operating means.

The front brake is operated by the first two parallel systems, and the rear brake is operated by the second two parallel systems. Accordingly, in each of the first and second two parallel systems, no interference between the inputs occurs. This reduces the complexity of the control logic.

The electronic control means can perform interlock control of the two driving means according to the operational amounts of the two brake operating means, thereby properly distributing a braking force to the front brake and the rear brake.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
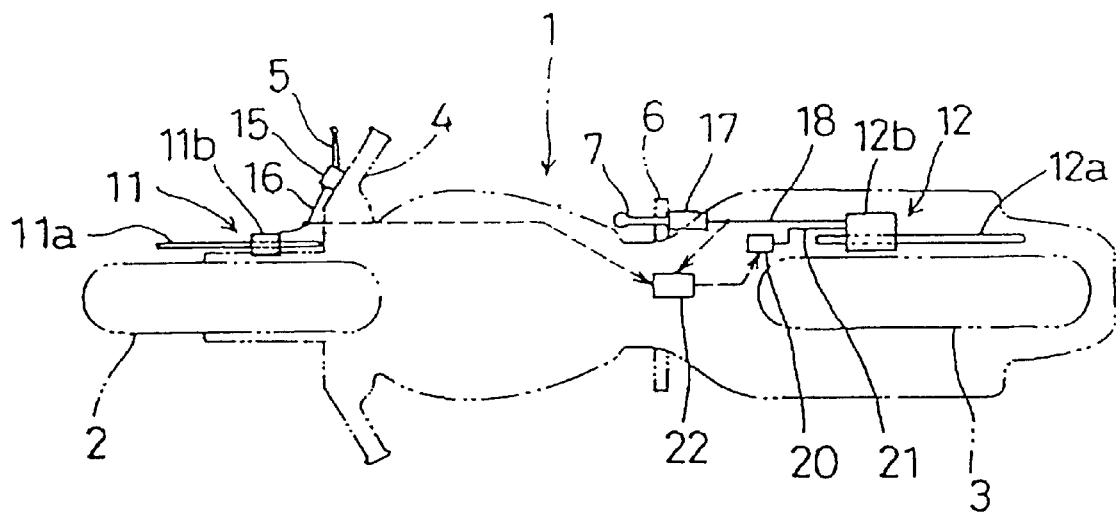
FIG. 1 is a schematic view of a brake system according to a first embodiment of the present invention.

FIG. 1 is a schematic view of a brake system in a motorcycle 1 to which a braking device according to a first embodiment of the invention is applied. Reference numeral 2 denotes a front wheel provided with a hydraulic front brake 11, and reference numeral 3 denotes a rear wheel as a drive wheel provided with a hydraulic rear brake 12. Both the front brake 11 and the rear brake 12 are disc brakes. The front brake 11 is composed of a brake disc 11a and a brake caliper 11b, and the rear brake 12 is composed of a brake disc 12a and a brake caliper 12b. Reference numeral 4 denotes a right handle provided with a brake lever 5, and reference numeral 6 denotes a right step near which a brake pedal 7 is provided.

The brake lever 5 is mounted on a lever master cylinder 15, and the brake pedal 7 is mounted on a pedal master cylinder 17. Piping of a lever hydraulic system 16 extending from the lever master cylinder 15 is connected to the brake caliper 11b of the front brake 11, and piping of a pedal hydraulic system 18 extending from the pedal master cylinder 17 is connected to the brake caliper 12b of the rear brake 12.

An electronically controlled actuator 20 is provided near the rear brake 12. The actuator 20 and the rear brake 12 are connected by piping of an electronically controlled hydraulic system 21.

The actuator 20 is controlled by an electronic control unit (ECU) 22. Detection signals indicative of hydraulic pressures in the lever hydraulic system 16 and the pedal hydraulic system 18 are input into the ECU 22.

Figure 2:
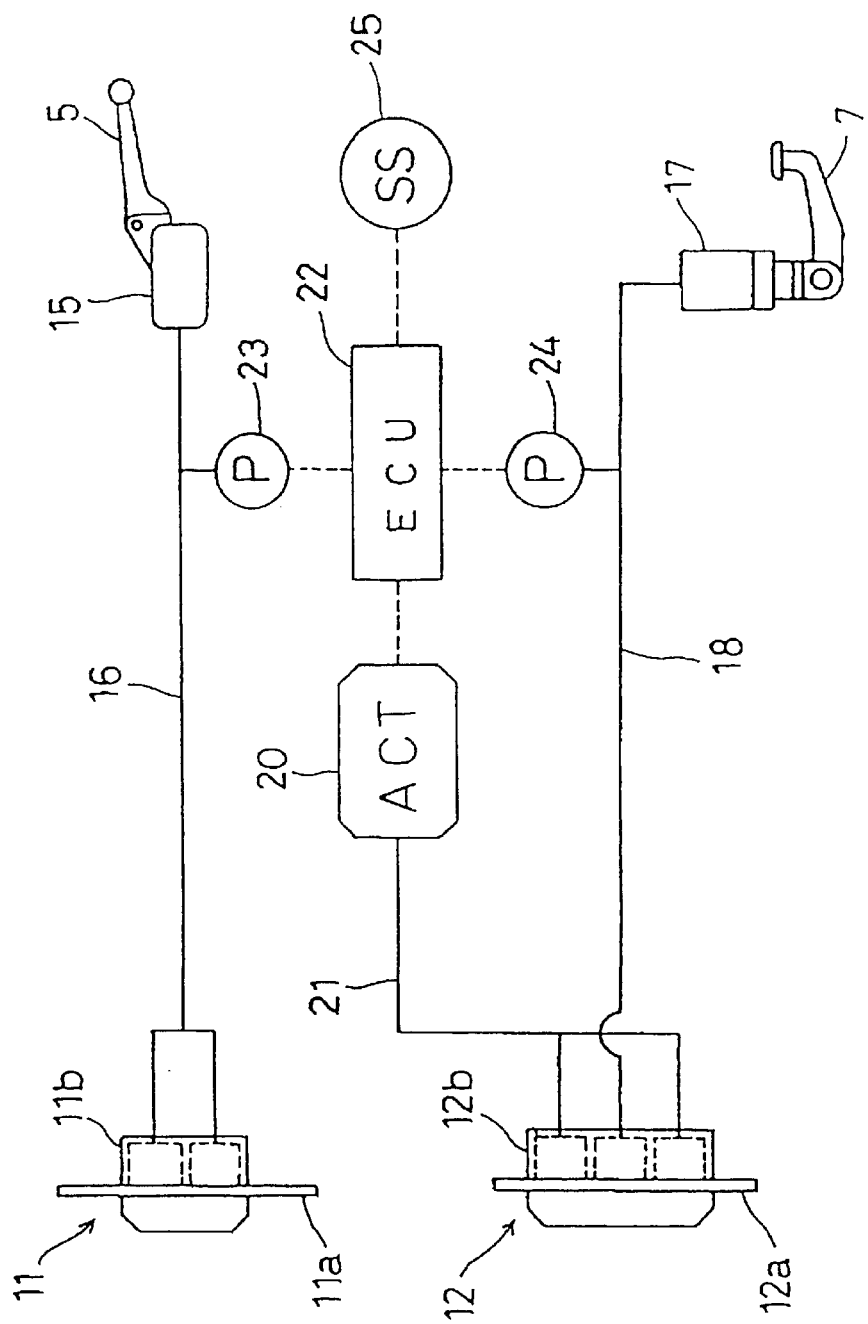
FIG. 2 is a diagram of the brake system according to a first embodiment of the present invention.

FIG. 2 is a diagram of the brake system according to the first embodiment of the invention. The lever hydraulic system 16 is provided with a pressure sensor 23. The pressure sensor 23 detects an operating pressure as an operating amount produced in the lever master cylinder 15 by operating the brake lever 5, and outputs a detection signal indicative of the operating pressure to the ECU 22.

Similarly, the pedal hydraulic system 18 is provided with a pressure sensor 24 for detecting an operating pressure produced in the pedal master cylinder 17 by operating the brake pedal 7 and outputting a detection signal to the ECU 22.

The front brake 11 is of a two-port type such that the brake caliper 11b has two pistons. The lever hydraulic system 16 is connected to the two ports of the brake caliper 11b. The rear brake 12 is of a three-port type such that the brake caliper 12b has three pistons. The pedal hydraulic system 18 is connected to one of the three ports of the brake caliper 12b, and the electronically controlled hydraulic system 21 is connected to the other two ports of the brake caliper 12b.

The brake system further includes a slip sensor (SS) 25 for detecting a slip amount of the rear wheel 3. The slip amount is calculated by comparing the drive wheel 3 speed to the vehicle speed. A detection signal from the slip sensor 25 is also input into the ECU 22.

The operation of the braking device having the above-mentioned configuration will now be described. When the brake pedal 7 only is operated, a hydraulic pressure (a pedal operating pressure) is supplied through the pedal hydraulic system 18 to one of the three ports of the brake caliper 12b of the rear brake 12. At the same time, the pedal operating pressure is detected by the pressure sensor 24, and a detection signal indicative of the pedal operating pressure is output from the pressure sensor 24 to the ECU 22. The ECU 22 computes according to the detection signal output from the pressure sensor 24 to output a control signal, which is in turn input into the electronically controlled actuator 20. Then, the actuator 20 supplies a hydraulic pressure controlled by the ECU 22 to the other two ports of the brake caliper 12b of the rear brake 12.

Thus, when only the brake pedal 7 is operated, a hydraulic pressure is supplied to one of the three ports of the rear brake 12 by the pedal hydraulic system 18, and a hydraulic pressure is also supplied to the other two ports of the rear brake 12 under control by the electronically controlled brake system including the ECU 22, thereby braking the rear wheel 3 only.

When only the brake lever 5 is operated, a hydraulic pressure (a lever operating pressure) is supplied through the lever hydraulic system 16 to the front brake 11, thereby braking the front wheel 2. At the same time, the lever operating pressure is detected by the pressure sensor 23, and a detection signal indicative of the lever operating pressure is output from the pressure sensor 23 to the ECU 22. Then, a controlled hydraulic pressure is supplied to the rear brake 12 by the electronically controlled brake system according to the detection signal, thereby braking the rear wheel 3 with suitable timing under suitable pressure. Thus, a braking force is properly distributed to the front wheel 2 and the rear wheel 3.

When both the brake lever 5 and the brake pedal 7 are simultaneously operated, hydraulic pressures (the lever operating pressure and the pedal operating pressure) are supplied through the lever hydraulic system 16 and the pedal hydraulic system 18 directly to the front brake 11 and the rear brake 12, respectively, thereby braking both the front wheel 2 and the rear wheel 3. At the same time, the lever operating pressure and the pedal operating pressure are detected by the pressure sensors 23 and 24, respectively, and detection signals indicative of the lever operating pressure and the pedal operating pressure are output from the pressure sensors 23 and 24 to the ECU 22. Then, the ECU 22 computes according to the detection signals to output a control signal to operate the electronically controlled actuator 20 according to the control signal. Accordingly, the rear wheel 3 is further braked under suitable pressure. Thus, a braking force is properly distributed to the front wheel 2 and the rear wheel 3.

The above-mentioned brake control is carried out during normal running of the motorcycle 1. The ECU 22 also receives a detection signal from the slip sensor 25 to carry out traction control. Traction control is started when the operator applies an excess drive torque to the rear wheel 3 during acceleration and the slip amount (the difference between the wheel speed of the rear wheel 3 and a vehicle speed of the motorcycle 1) becomes greater than a given value.

Figure 3:
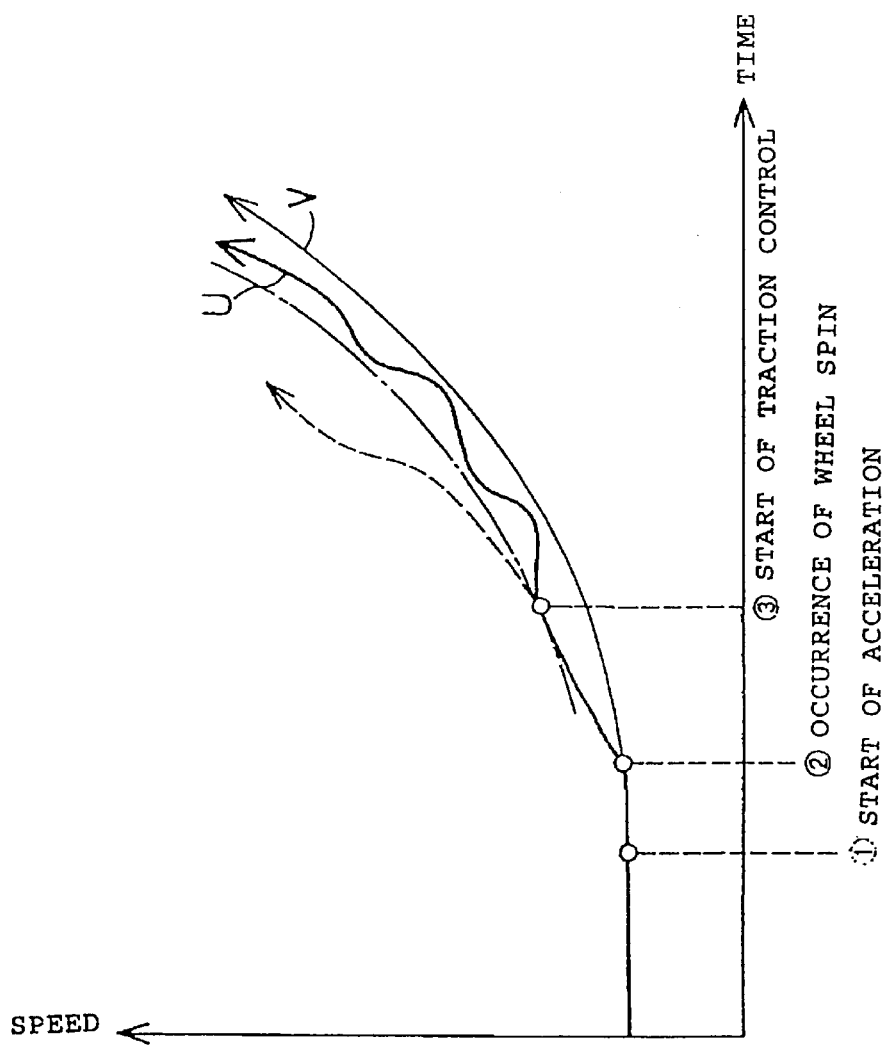
FIG. 3 is a plot of wheel speed and vehicle speed when normal traction control is carried out.

FIG. 3 is a plot showing changes of wheel speed U and vehicle speed V when normal traction control is carried out. Acceleration is started at an instant (1). When the accelerating operation by the operator becomes excessive during acceleration, an excess drive torque is applied to the drive wheel, causing the occurrence of wheel spin at an instant (2). As a result, the wheel speed U exceeds the vehicle speed V to produce a difference (slip amount).

A traction control threshold (shown by a single dot & dash line) is preset in the ECU 22 for the difference (the slip amount) between the wheel speed U and the vehicle speed V. When the wheel speed U reaches the traction control threshold at an instant (3), the traction control is started to brake the drive wheel, thereby avoiding undue slip.

The above-mentioned traction control is normally carried out. However, the operator may wish to simultaneously carry out an accelerating operation and a braking operation of the drive wheel to positively maintain the wheel spin within a fixed speed. This is known as performing a special braking (as in a drift controlled condition during a race).

In this case, to give a priority to the braking operation by the operator, the ECU 22 detects the above operation by the operator to shift the traction control threshold to a higher speed.

Figure 4:
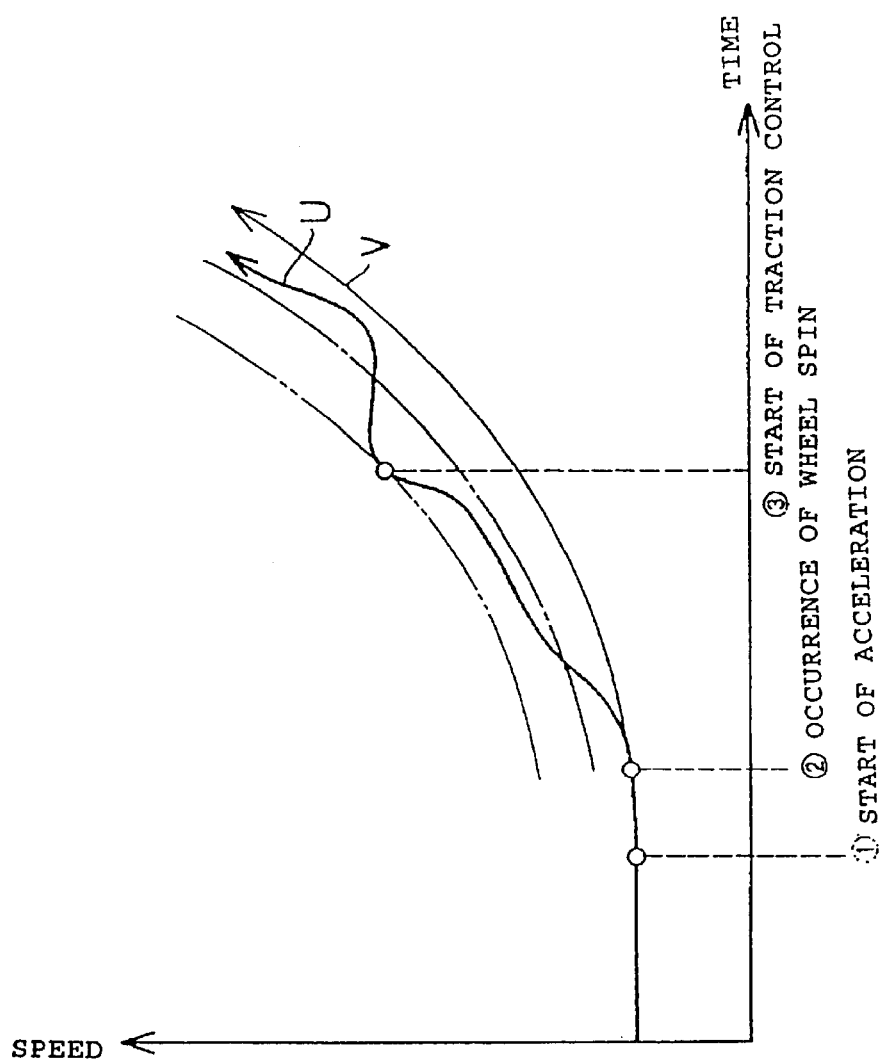
FIG. 4 is a plot of wheel speed and vehicle speed when traction control upon special braking is carried out.

As shown in FIG. 4, the traction control threshold is changed from the previous (normal) position (single dot & dash line) to an upwardly shifted position (double dot dash line), thereby retarding the start of the traction control by electronic control so long as the difference between the wheel speed U and the vehicle speed V does not become considerably large. Accordingly, until the traction control is started, the degree of freedom of the braking operation using the pedal hydraulic system 18 by the operator can be increased, thus ensuring a running condition reflecting the braking operation performed by the operator.

The rear brake 12 is operated under control by the two systems—the pedal hydraulic system 18 and the electronically controlled brake system. Accordingly, if one of the two systems fails, the rear brake 12 can be operated by the other system.

Figure 5:
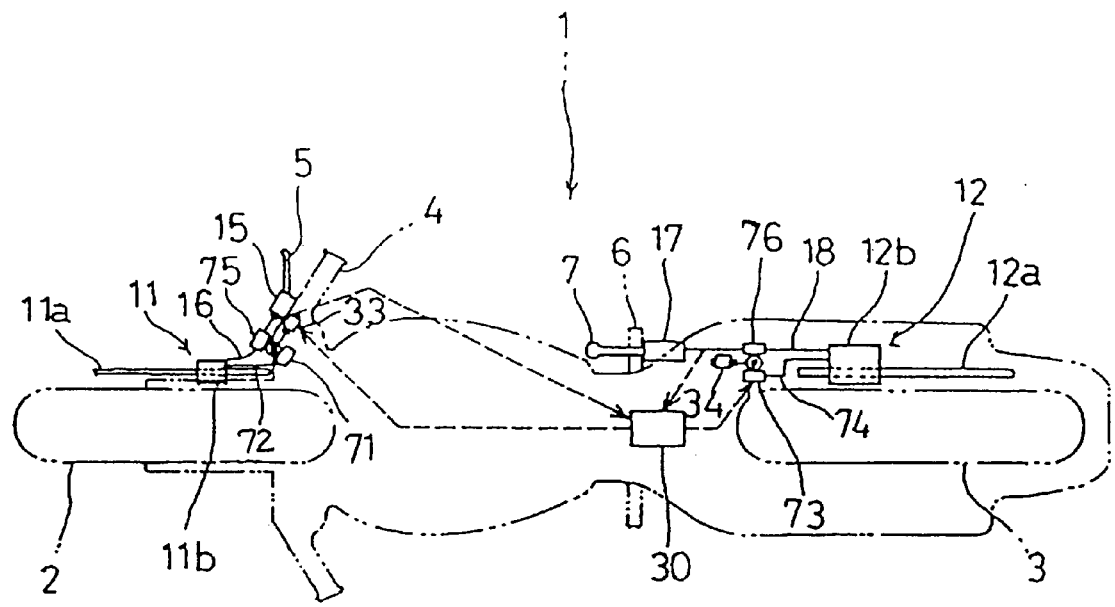
FIG. 5 is a schematic view of a brake system according to a second embodiment of the present invention.

FIG. 5 is a schematic view of a brake system according to a second embodiment of the present invention, wherein like numerals denote like elements present in the first embodiment of the invention. Both the front brake 11 and the rear brake 12 are disc brakes. The front brake 11 includes a brake disc 11a and a brake caliper 11b, and the rear brake 12 includes a brake disc 12a and a brake caliper 12b. A right handle 4 is provided with a brake lever 5, and a right step 6 is provided near a brake pedal 7. The brake lever 5 is mounted on a lever master cylinder 15, and the brake pedal 7 is mounted on a pedal master cylinder 17.

Piping of a lever hydraulic system 16 extending from the lever master cylinder 15 is connected through an ABS 75 to the brake caliper 11b of the front brake 11, and piping of a pedal hydraulic system 18 extending from the pedal master cylinder 17 is connected through an ABS 76 to the brake caliper 12b of the rear brake 12.

A hydraulic control actuator 71 is provided in proximity to the ABS 75, and is connected through piping of an electronically controlled hydraulic system 72 to the brake caliper 11b of the front brake 11. Similarly, a hydraulic control actuator 73 is provided in proximity to the ABS 76, and is connected through piping of an electronically controlled hydraulic system 74 to the brake caliper 12b of the rear brake 12.

A servomotor 33 for driving both the ABS 75 and the hydraulic control actuator 71 is provided between the ABS 75 and the hydraulic control actuator 71. Similarly, a servomotor 34 for driving both the ABS 76 and the hydraulic control actuator 73 is provided. The servomotors 33 and 34 are controlled by an electronic control unit (ECU) 30. Detection signals indicative of hydraulic pressures in the lever hydraulic system 16 and the pedal hydraulic system 18 are input into the ECU 30.

Figure 6:
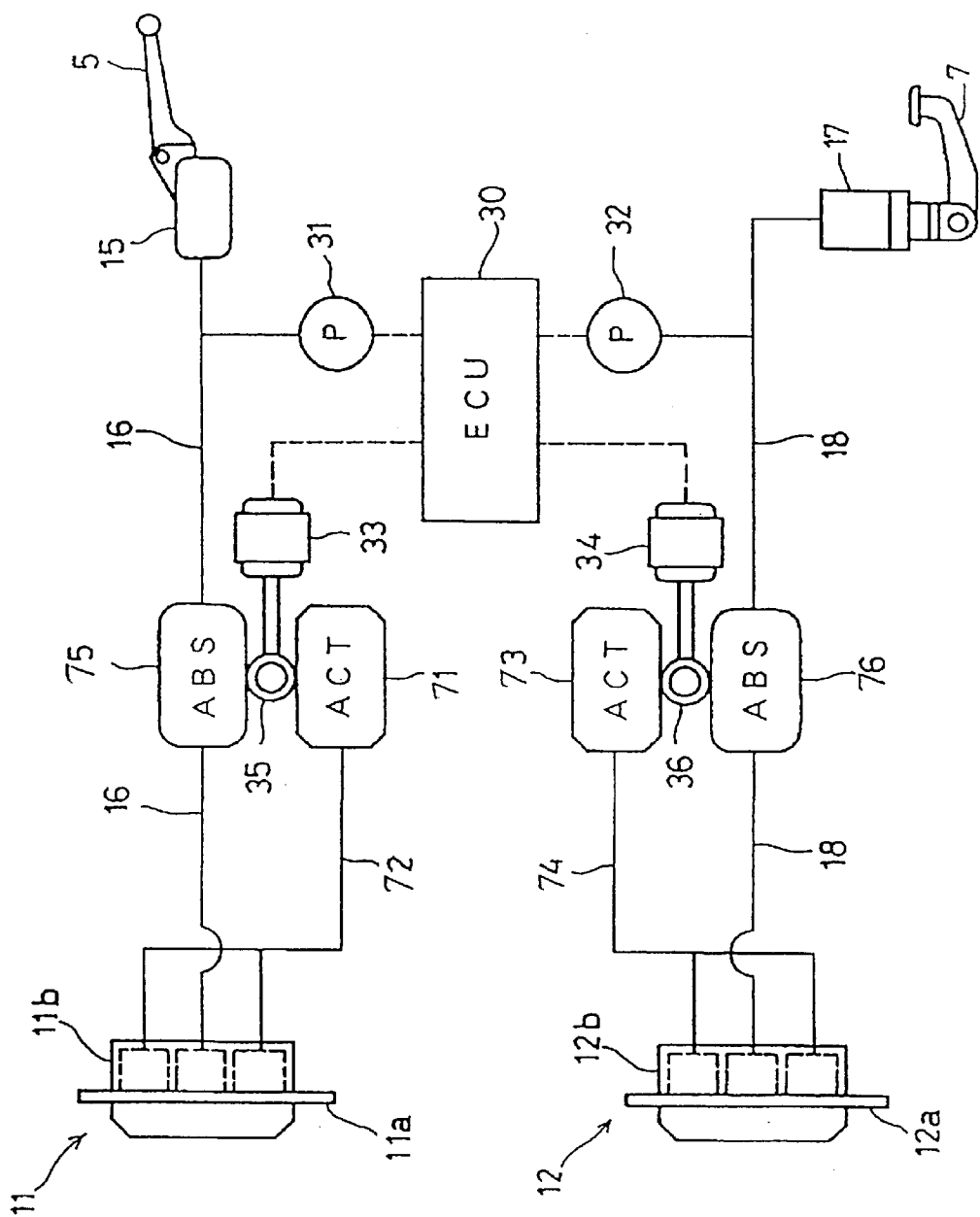
FIG. 6 is a diagram of the brake system according to the second embodiment of the invention.

FIG. 6 is a diagram of the brake system according to the second embodiment of the invention. The lever hydraulic system 16 is provided with the ABS 75 and a pressure sensor 31. The pressure sensor 31 detects an operating pressure produced in the lever master cylinder 15 by operating the brake lever 5, and outputs a detection signal indicative of the operating pressure to the ECU 30.

Similarly, the pedal hydraulic system 18 is provided with the ABS 76 and a pressure sensor 32. The pressure sensor 32 detects an operating pressure produced in the pedal master cylinder 17 by operating the brake pedal 7, and outputs a detection signal indicative of the operating pressure to the ECU 30.

The front brake 11 is a three-port type such that the brake caliper 11b has three pistons. The lever hydraulic system 16 is connected to one of the three ports of the brake caliper 11b, and the electronically controlled hydraulic system 72 is connected to the other two ports of the brake caliper 11b. Similarly, the rear brake 12 is also of a three-port type such that the brake caliper 12b has three pistons. The pedal hydraulic system 18 is connected to one of the three ports of the brake caliper 12b, and the electronically controlled hydraulic system 24 is connected to the other two ports of the brake caliper 12b.

Thus, hydraulic pressures are applied to the front brake 11 by the two independent systems, i.e., the lever hydraulic system 16 and the electronically controlled hydraulic system 72. This prevents interference between these hydraulic pressures. Similarly, hydraulic pressures are applied to the rear brake 12 by the two independent systems, thereby preventing interference between these hydraulic pressures.

The servomotor 33 to be driven and controlled by the ECU 30 drives both the ABS 75 and the hydraulic control actuator 71 through a gear mechanism 35. Similarly, the servomotor 34 to be driven and controlled by the ECU 30 drives both the ABS 76 and the hydraulic control actuator 73 through a gear mechanism 36.

Figure 7:
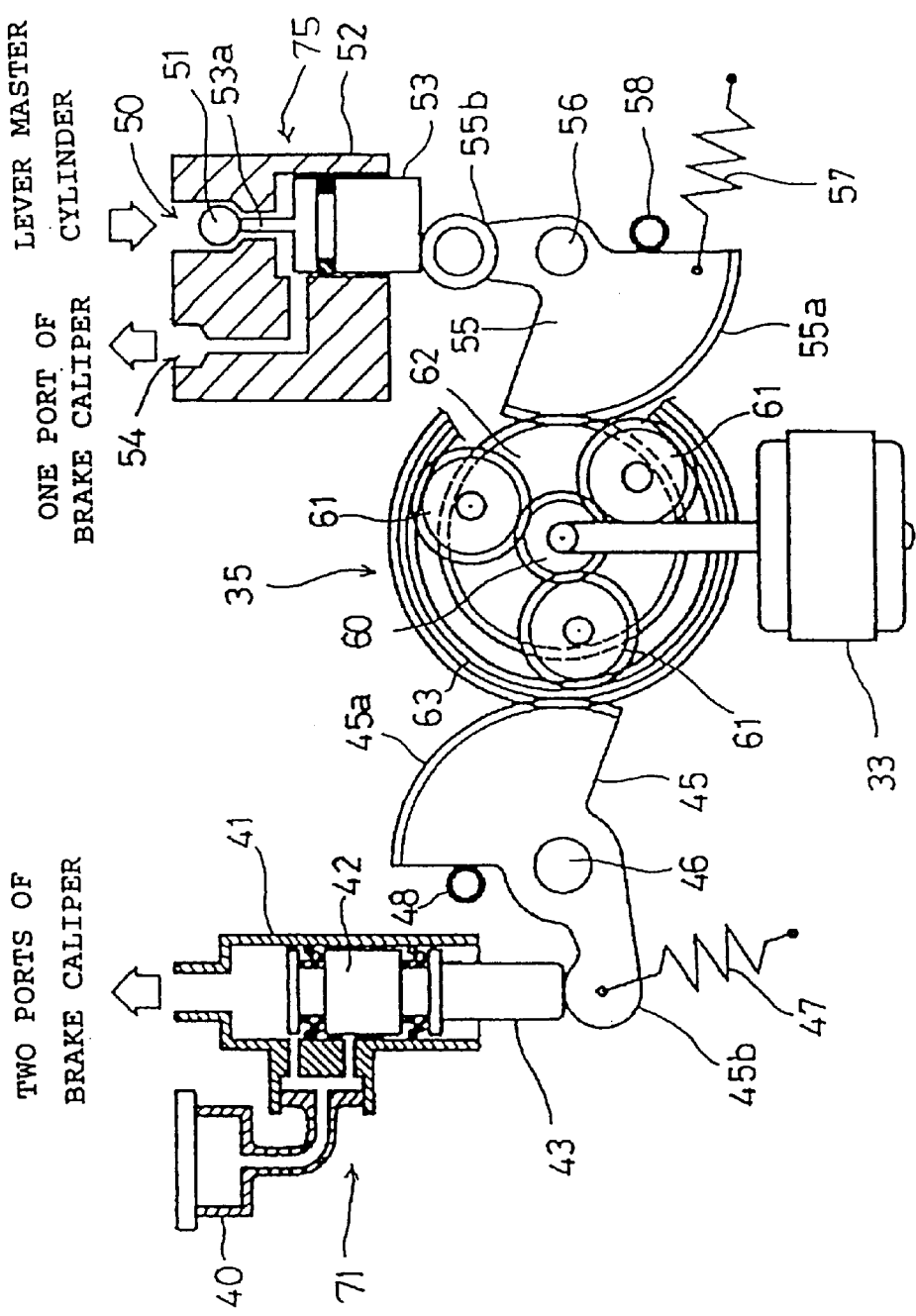
FIG. 7 is a schematic view of a structure for driving an ABS and a hydraulic control actuator.

FIG. 7 is a schematic view of a structure for driving an ABS and a hydraulic control actuator. The gear mechanisms 35 and 36 may have the same structure. The hydraulic control actuator 71 has a structure such that a piston 42 inserted in a hydraulic cylinder 41 connected to a hydraulic tank 40 slides inside the cylinder 41 to supply a hydraulic pressure to the two ports of the brake caliper 11b. A piston rod 43 of the piston 42 is operated by a pressure control gear 45.

The pressure control gear 45 is composed of a gear portion 45a having a sectorial shape whose center of its arc coincides with the center of a pivot shaft 46 for pivotably supporting the gear 45, and a lever portion 45b extending from the center of the arc of the gear portion 45a in a direction opposite thereto. The front end of the lever portion 45b abuts against the lower end of the piston rod 43 so as to push the piston rod 43. The pressure control gear 45 is pivotably mounted on the pivot shaft 46, and is normally biased by a spring 47 in a direction opposite to the direction of pushing of the piston rod 43. A stopper 48 is provided to restrict undue pivotal movement of the pressure control gear 45 about the pivot shaft 46.

The ABS 75 has a structure such that a ball-shaped valve 51 is movably installed in an input port 50 to which a hydraulic pressure from the lever master cylinder 15 is supplied so as to open and close an oil passage communicating with the input port 50. Further, a piston 53 is slidably inserted in a cylinder 52 formed so as to be opposed to the input port 50. When a rod 53a extending from the piston 53 is raised to push the valve 51, the oil passage is opened, whereas when the rod 53a is lowered to be separated from the valve 51, the oil passage is closed by the valve 51. The oil passage also communicates with an output port 54 connected to one port of the brake caliper 11b.

The piston 53 is operated by an ABS control gear 55. The ABS control gear 55 is composed of a gear portion 55a having a sectorial shape whose center of its arc coincides with the center of a pivot shaft 56 for pivotably supporting the gear 55, and a lever portion 55b extending from the center of the arc of the gear portion 55a in a direction angled with respect to the gear portion 55a. The front end of the lever portion 55b abuts against the lower end surface of the piston 53 so as to push the piston 53. The ABS control gear 55 is pivotably mounted on the pivot shaft 56, and is normally biased by a spring 57 in a direction opposite to the direction of pushing of the piston 53. A stopper 58 is provided to restrict undue pivotal movement of the ABS control gear 55 about the pivot shaft 56.

The pressure control gear 45 and the ABS control gear 55 are operatively engaged with the gear mechanism 35, which is driven by the servomotor 33. The gear mechanism 35 is configured by a planetary gear mechanism having a structure such that a sun gear 60 is directly rotated by the servomotor 33, and three planetary gears 61 mesh with the sun gear 60 so as to surround the sun gear 60. The planetary gears 61 are supported by a carrier 62 forming a gear which may rotate and revolve. The planetary gears 61 further mesh with the internal teeth of a ring gear 63 surrounding the planetary gears 61.

The gear portion 45a of the pressure control gear 45 meshes with the external teeth of the ring gear 63, and the gear portion 55a of the ABS control gear 55 meshes with the gear of the carrier 62. Accordingly, when the sun gear 60 is rotationally driven by the servomotor 33, the ring gear 63 and the carrier 62 are rotated through the planetary gears 61 to thereby operate the pressure control gear 45 and the ABS control gear 55.

Although not shown, a structure for driving the ABS 76 and the hydraulic control actuator 73 by means of the gear mechanism 36 and the servomotor 34 can be, for example, the same as the structure shown in FIG. 7. Each structure is a simple structure such that the ABS and the hydraulic control actuator are driven by the single servomotor.

The operation of the braking device having the above configuration will now be described. Detection signals from the pressure sensors 31 and 32 for detecting the hydraulic pressures in the lever hydraulic system 16 and the pedal hydraulic system 18 are input into the ECU 30. Then, the servomotors 33 and 34 are controlled by the ECU 30. The ECU 30 performs various controls including brake assist control for assisting the braking operations of the front brake 11 and the rear brake 12, interlock control for properly distributing a braking force to the front brake 11 and the rear brake 12, and ABS control for operating each ABS.

Figure 8:
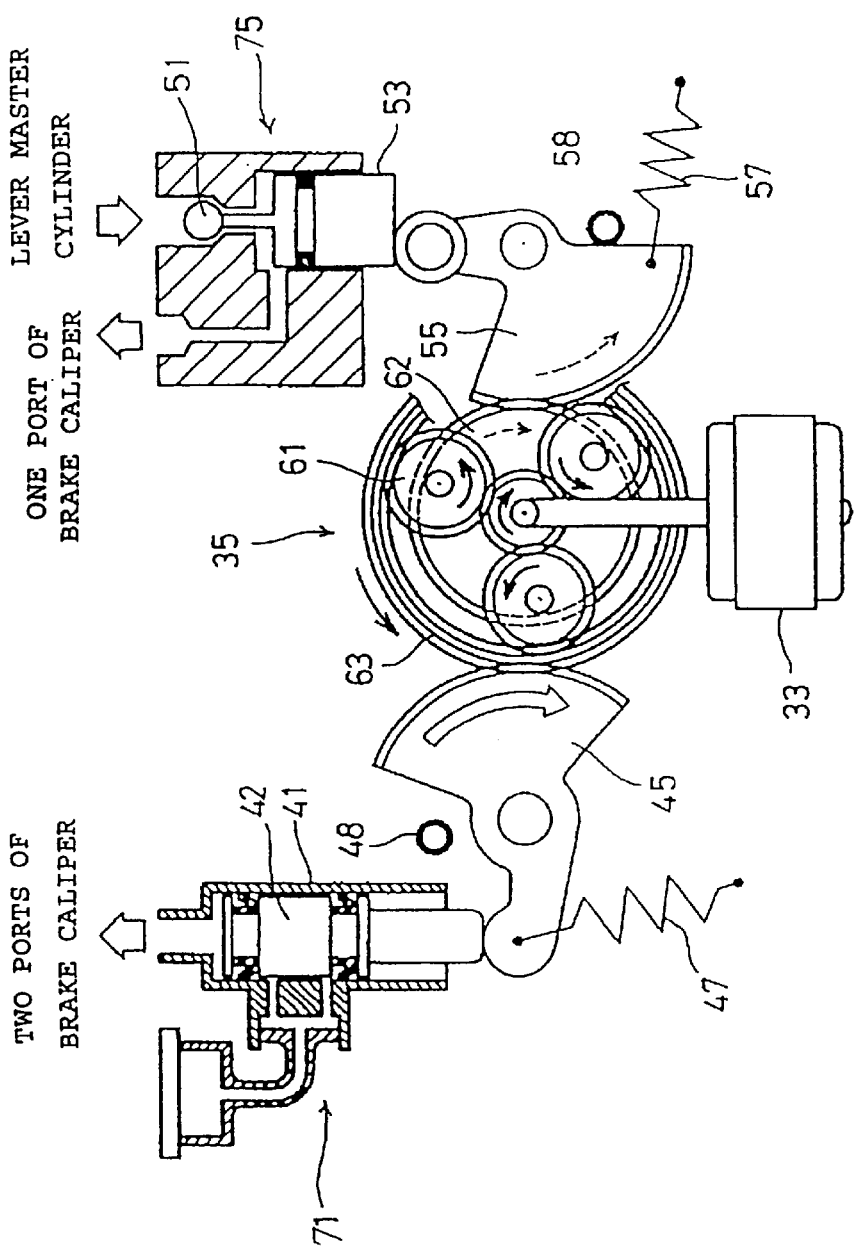
FIG. 8 is a schematic view of the operation of the gear mechanism, the ABS, and the hydraulic control actuator in the case of performing brake assist control.

In the case of performing brake assist control or interlock control, the servomotor 33 is normally driven to rotate the sun gear 60 clockwise as shown in FIG. 8. As a result, the pressure control gear 45 and the ABS control gear 55 receive the torque from the sun gear 60 as shown by the arrows in FIG. 8. The ABS control gear 55 is pivotally moved until it abuts against the stopper 58, so that the ABS control gear 55 is kept in its initial position where it is restricted by the stopper 58. As a result, the piston 53 of the ABS 75 is pushed by the ABS control gear 55 to lift the valve 51 and open the oil passage, thereby supplying a hydraulic pressure from the lever master cylinder 15 to one port of the brake caliper 11b.

The carrier 62 is restrained by the engagement with the ABS control gear 55 abutting against the stopper 58. Accordingly, the planetary gears 61 rotate to transmit the torque through the ring gear 63 to the pressure control gear 45. As a result, the piston 42 of the hydraulic control actuator 71 is pushed by the pressure control gear 45 to thereby generate a hydraulic pressure and supply it to the other two ports of the brake caliper 11b.

In the case of reducing the hydraulic pressure applied to the brake caliper 11b or ending the operation, the duty ratio of the servomotor 33 is reduced to a certain value or zero, thereby returning the pressure control gear 45 to a balanced position with the ABS control gear 55 maintained at its initial position.

Figure 9:
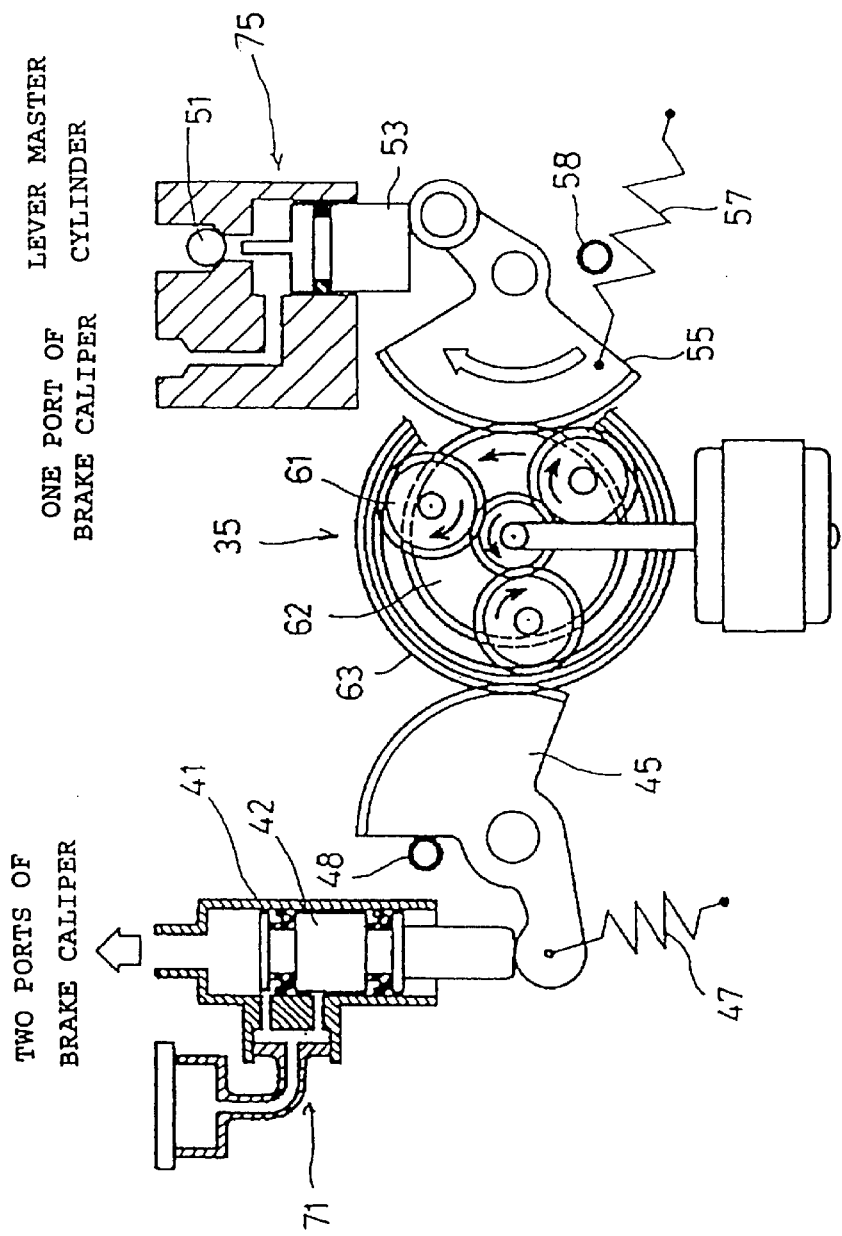
FIG. 9 is a schematic view of the operation of the gear mechanism, the ABS, and the hydraulic control actuator in the case of performing ABS control.
Figure 10:
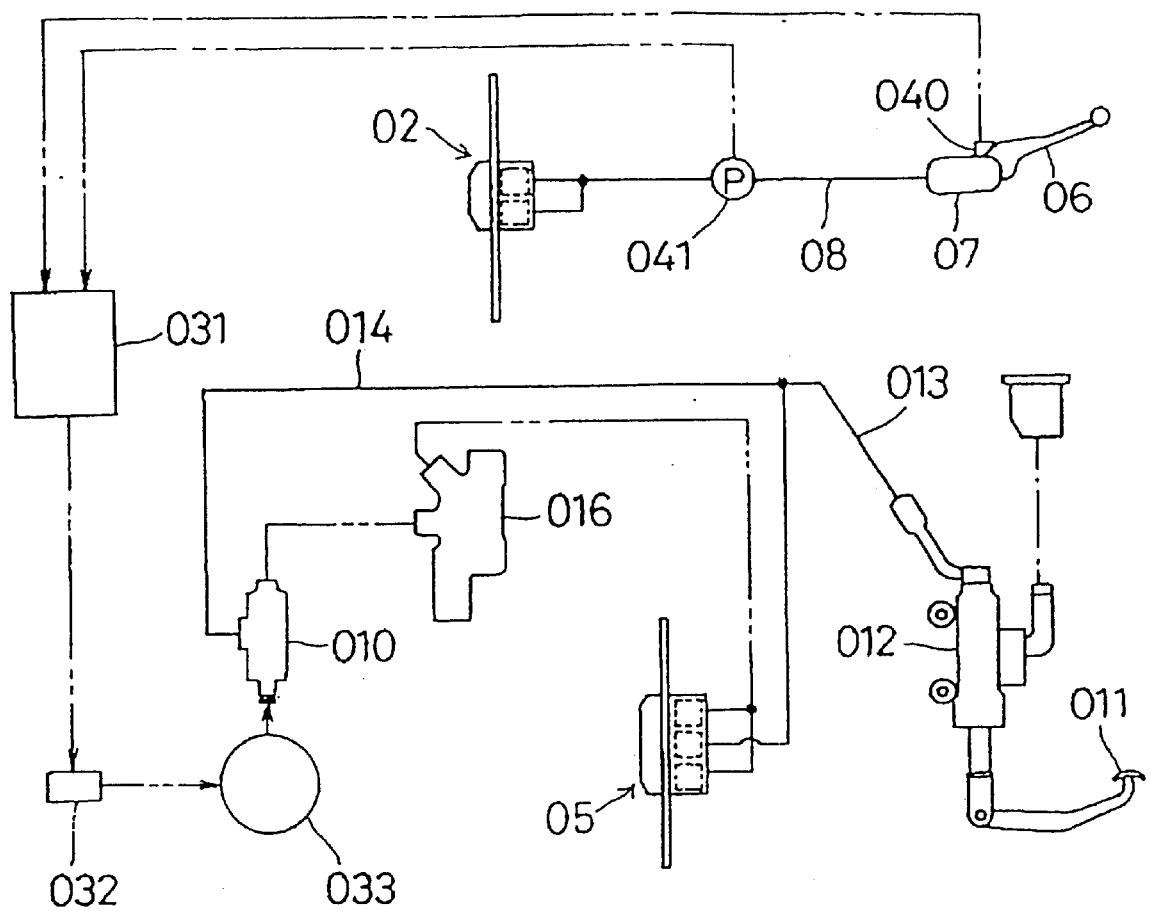
FIG. 10 is a diagram showing the configuration of a brake system in a conventional braking device.

In the case of starting the ABS control to reduce the braking force, the servomotor 33 is driven to rotate the sun gear 60 counterclockwise as shown in FIG. 9. When the pressure control gear 45 is in operation, the gear 45 is pivotally moved to abut against the stopper 48, thereby reducing the hydraulic pressure. In the case of further reducing the hydraulic pressure from the lever master cylinder 15, the motor torque continues to be transmitted to the ABS control gear 55 to pivotally move the ABS control gear 55 in the clockwise direction (shown by an arrow in FIG. 9). As a result, the piston 53 lowers and the valve 51 accordingly closes the oil passage, thereby reducing the hydraulic pressure applied to the brake caliper 11b.

In the case of increasing the hydraulic pressure after the above pressure reduction under ABS control, the motor torque is transmitted in the direction opposite to that in the case of pressure reduction. Accordingly, the ABS control gear 55 and the pressure control gear 45 are pivotally moved so as to increase the hydraulic pressure. The two gears 55 and 45 operate in a balanced condition proportional to a set gear ratio, thereby allowing a pressure increase with higher response and ratio.

As described above, the hydraulic control actuator 71 and the ABS 75 are driven under control by the single servomotor 33. Accordingly, both the pedal hydraulic system 16 having the ABS 75 and the electronically controlled hydraulic system 72 can be simply controlled with a reduced number of parts, thus reducing the cost. The above-mentioned brake control for the front brake 11 similarly applies to the rear brake 12.

The lever hydraulic system 16 connects the lever master cylinder 15 and the front brake 11, and the pedal hydraulic system 18 connects the pedal master cylinder 17 and the rear brake 12. Accordingly, the piping of these systems 16 and 18 are relatively short.

Further, the electronically controlled hydraulic system 72 is located in the vicinity of the front brake 11, and the electronically controlled hydraulic system 74 is located in the vicinity of the rear brake 12. Accordingly, the piping of these systems 72 and 74 can be relatively short. Thus, the piping of the hydraulic systems can be simplified with a reduced number of parts, thereby simplifying assembly and maintenance work.

The front brake 11 is operated under control by two systems (the lever hydraulic system 16 and the electronically controlled hydraulic system 72). Accordingly, if one of the two systems fails, the front brake 11 can be operated by the other system. Similarly, the rear brake 12 is operated under control by the two systems (the pedal hydraulic system 18 and the electronically controlled hydraulic system 74). Accordingly, if one of these two systems fails, the rear brake 12 can be operated by the other system.

While a servomotor is used to drive the hydraulic control actuator and the ABS for each of the front brake 11 and the rear brake 12 in this preferred embodiment, any other driving means such as a pump may be used in place of the servomotor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A braking device for a vehicle comprising:
   a hydraulic brake having a brake caliper with a plurality of ports;
   an operational brake system for supplying a braking pressure input to a first port of said brake caliper;
   a pressure sensor for detecting the pressure in said operational brake system and for outputting a detection signal indicative of the operating pressure of said operational brake system; and
   an electronically controlled brake system having an actuator and an electronic control unit, the electronic control unit controlling the actuator in response to said detection signal from said pressure sensor supplied by the operational brake system for supplying a braking pressure input to a second port of said brake caliper;
   said operational braking system being arranged in parallel to said electronically controlled brake system wherein the braking pressure input supplied to said first port of said brake caliper is supplied in parallel to the braking pressure input to said second port of said brake caliper.

2. The braking device of claim 1, wherein said braking pressure supplied to said first port is independent of the braking pressure supplied to said second port.

3. The braking device of claim 2, wherein the brake caliper includes three ports, the braking pressure input from said electronically controlled brake system is supplied to two of said three ports, and the operational brake system braking pressure is supplied to the remaining port.

4. The braking device of claim 2, wherein said hydraulic brake acts on a drive wheel of the vehicle, and the braking device further comprises a front hydraulic brake which operates on a front wheel of the vehicle.

5. The braking device of claim 4, wherein the operational brake system includes:
   a brake lever;
   a lever master cylinder responsive to the brake lever and supplying said braking pressure input to the front hydraulic brake;
   a brake pedal; and
   a pedal master cylinder which supplies said braking pressure input to the hydraulic brake which acts on the drive wheel.

6. The braking device of claim 5, wherein said pressure sensor includes:
   a first pressure sensor which senses the amount of braking pressure input supplied by the lever master cylinder; and
   a second pressure sensor which senses the amount of braking pressure input supplied by the pedal master cylinder.

7. The braking device of claim 1, further comprising a slip detecting means for detecting the amount of slip of a drive wheel of the vehicle.

8. The braking device of claim 7, wherein the hydraulic brake acts on the drive wheel, and said electronic control unit controls the actuator according to the amount of slip detected by the slip detecting means.

9. A braking device comprising:
   an operational brake system supplying a braking pressure input to a first port of a brake;
   a pressure sensor for detecting the pressure in said operational brake system and for outputting a detection signal indicative of the operating pressure of said operational brake system; and
   an electronically controlled brake system connected to a second port of said brake, said detection signal from said pressure sensor being supplied to said electronically controlled brake system for providing a braking pressure input to said second port of said brake; wherein
   the operational brake system and the electronically controlled brake system apply respective braking pressures to respective ports without interference between the respective braking pressures.

10. The braking device of claim 9, wherein
    the operational brake system includes first hydraulic piping;
    the electronically controlled brake system includes second hydraulic piping;
    the braking pressure of the operational braking system and the braking pressure of the electronically controlled brake system includes brake fluid; and
    the first and second pipings convey brake fluid to respective ports of the brake without intersection or mixing of the brake fluid in the separate pipings.

* * * * *